United States Patent

Attix et al.

Patent Number: 5,272,742
Date of Patent: Dec. 21, 1993

[54] UPPER END FITTING

[75] Inventors: Douglas J. Attix; Samuel V. Pickerel, Jr.; John E. Riordan, III, all of Lynchburg, Va.

[73] Assignee: B&W Fuel Company, Lynchburg, Va.

[21] Appl. No.: 915,573

[22] Filed: Jul. 20, 1992

[51] Int. Cl.⁵ .............................................. G21C 3/32
[52] U.S. Cl. ..................................... 376/446; 376/364
[58] Field of Search ............... 376/446, 261, 224, 327, 376/364; 976/DIG. 102, DIG. 100, DIG. 118; 29/173, 723, 230

[56] References Cited

U.S. PATENT DOCUMENTS

| | | | |
|---|---|---|---|
| Re. 31,583 | 1/1984 | Klumb et al. | 376/364 |
| 3,475,273 | 10/1969 | Krawiec | 176/78 |
| 3,515,638 | 6/1970 | Nims, Jr. | 176/28 |
| 3,600,276 | 8/1971 | Nims, Jr. | 176/28 |
| 3,689,358 | 9/1972 | Smith et al. | 176/78 |
| 3,770,583 | 5/1973 | Klumb et al. | 176/76 |
| 3,801,453 | 4/1974 | Jones | 176/78 |
| 4,072,562 | 6/1978 | Sankovich | 176/50 |
| 4,072,564 | 2/1978 | Jabsen | 176/76 |
| 4,076,586 | 2/1978 | Bideau et al. | 176/78 |
| 4,078,967 | 3/1978 | Anthony | 176/78 |
| 4,192,716 | 6/1980 | Anthony | 176/78 |
| 4,208,249 | 2/1980 | Jabsen | 176/76 |
| 4,278,501 | 7/1981 | Steinke | 176/78 |
| 4,304,631 | 12/1981 | Walton et al. | 376/327 |
| 4,420,457 | 12/1983 | Le Pargneux | 376/446 |
| 4,427,624 | 1/1984 | Marlatt et al. | 376/352 |
| 4,534,933 | 8/1985 | Gjertsen et al. | 376/364 |
| 4,551,300 | 11/1985 | Feutrel | 376/364 |
| 4,560,532 | 12/1985 | Barry et al. | 376/434 |
| 4,631,166 | 12/1986 | Camden, Jr. | 376/435 |
| 4,671,924 | 1/1987 | Gjertsen et al. | 376/285 |
| 4,729,868 | 3/1988 | Gillett et al. | 376/285 |
| 4,857,264 | 8/1989 | Veronesi et al. | 376/353 |
| 4,986,960 | 1/1991 | Larson | 376/446 |
| 5,118,465 | 6/1992 | Guironnet et al. | 376/261 |

Primary Examiner—Daniel D. Wasil
Assistant Examiner—Meena Chelliah
Attorney, Agent, or Firm—Robert J. Edwards; D. Neil LaHaye

[57] ABSTRACT

An upper end fitting for a nuclear fuel assembly. A main body portion that is square in section has a base rigidly attached thereto. A combined pedestal and holddown spring assembly received in the main body portion is formed from leaf springs attached together by a bolt and nut. The leaf springs are bolted together such that the exterior radius or convex surface of the springs face each other. The bolt and nut are sized and shaped to serve as the pedestal for the control assembly of the reactor. A spring retainer movably received in the main body portion retains the springs inside the main body portion. The retainer is also provided with a bore therethrough sized to allow the bolt/pedestal to extend therethrough.

1 Claim, 3 Drawing Sheets

UPPER END FITTING

BACKGROUND OF THE INVENTION

1. Field of the Invention

The invention is generally related to nuclear reactor fuel assemblies and particularly to springs used in end fittings of the assemblies.

2. General Background

Typically, a nuclear reactor for the generation of electrical power includes a core of fissionable material to heat a coolant flowing up therethrough. The fissionable material is enclosed in elongated fuel rods assembled in a square array called fuel assemblies. The fuel rods are held in spaced parallel relationship by a number of spacer grids distributed at intervals along the length of the assembly. The fuel assemblies are held in an array by core grid plates at the top and bottom and are provided with upper and lower end fittings for mating with the grid plates. Typically, holddown spring means is provided between the upper end fitting and the upper core grid plate. This is necessary to provide sufficient holddown force against hydraulic lift forces in the core generated by coolant flow. The springs also allow for axial dimensional growth of the fuel assembly due to either differential thermal expansion or irradiation induced material change. The problems of design, therefore, are in the ability to provide sufficient holddown force against hydraulic lift while allowing sufficient room for growth. Sufficient material strength and stiffness must be available within a limited volume area. The stiffness/volume efficiency of a spring becomes very important when used for nuclear fuel holddown.

Known devices which address this problem include the following.

U.S. Pat. No. 4,551,300 entitled "Nuclear Reactor Fuel Assembly End Fitting" discloses an end fitting having a plurality of rigid levers and elastic means in recesses in the end fitting which exert a restoring torque on corresponding levels.

U.S. Pat. Nos. 4,072,562 and 4,072,564 disclose the use of torsion bars as holddown means.

U.S. Pat. Nos. 4,671,924; 3,801,453; 4,427,624; 4,631,166; and 4,420,457 disclose the use of leaf springs as holddown means.

U.S. Pat. No. 4,986,960 discloses the use of an end fitting having hairpin shaped springs along each side of the end fitting.

U.S. Pat. Nos. Re 31,583; 3,475,273; 3,515,638; 3,600,276; 3,689,358; 3,770,583; 4,076,586; 4,078,967; 4,192,716; 4,208,249; 4,278,501; 4,534,933; 4,560,532; and 4,729,868 disclose the use of a variety of holddown devices including helical springs and are representative of the general state of the art.

In certain reactor designs, the upper end fitting also has a pedestal attached to the grillage. The pedestal serves as a resting point for control rod and axial power shaping rod assemblies. It is from this location that the reactor control component drives as well as other handling systems (not in the reactor) connect with the control rod and axial power shaping rod assemblies. The force of the helical holddown spring used in these designs is transmitted to the reactor internals by way of a spring retainer. The holddown function of the spring and the interface function of the pedestal are independent. Helical springs present two problems. They are fully exposed to coolant flow which subjects the springs to the dynamic stresses of flow induced vibration. Also, reconstitution of a fuel assembly utilizing helical springs is a relatively complex operation. Known structures that use a pedestal affixed to the upper end fitting grillage do not permit the use of a central leaf spring and the advantages it affords relative to the helical holddown spring.

SUMMARY OF THE INVENTION

The present invention addresses the above need in a straightforward manner. What is provided is an upper end fitting that combines the function of the control assembly pedestal of the end fitting and the connecting bolt and nut of a leaf holddown spring assembly. Leaf springs are bolted together such that the exterior radius of the leaf springs are facing each other. The nut and bolt used to connect the leaf springs together are sized to extend above the leaf springs and serve as the pedestal that will properly position the control assemblies. A spring retainer above the leaf springs is provided with a hole that allows passage of the nut and bolt as the system is deflected by the reactor internals upon installation.

BRIEF DESCRIPTION OF THE DRAWINGS

For a further understanding of the nature and objects of the present invention reference should be made to the following description, taken in conjunction with the accompanying drawings, in which like parts are given like reference numerals, and wherein.

DETAILED DESCRIPTION OF THE PREFERRED EMBODIMENT

Figure 1:
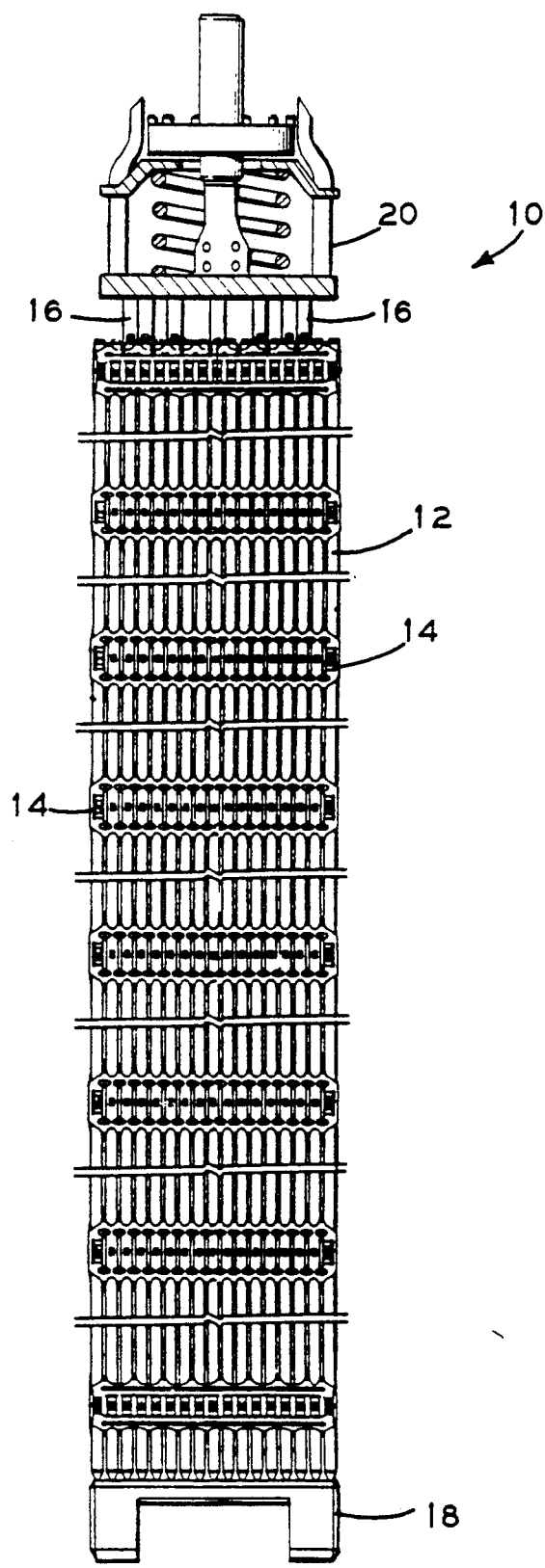
FIG. 1 is a side view of a typical fuel assembly.

FIG. 1 illustrates a typical nuclear fuel assembly 10. Fuel assembly 10 is generally comprised of a plurality of fuel rods 12, grid assemblies 14, guide tubes 16, lower end fitting 18, and upper end fitting 20. Fuel rods 12 are maintained in an array spaced apart by grid assemblies 14. Guide tubes 16 extend through grid assemblies 14 and are attached to lower end fitting 18 and upper end fitting 20 and, in addition to providing structural integrity to the entire assembly, also serve as guides for control rods not shown. Lower end fitting 18 and upper end fitting 20 provide structural and load bearing support to fuel assembly 10 and are also provided with openings therethrough to allow coolant to flow vertically through fuel assembly 10.

Figure 3:
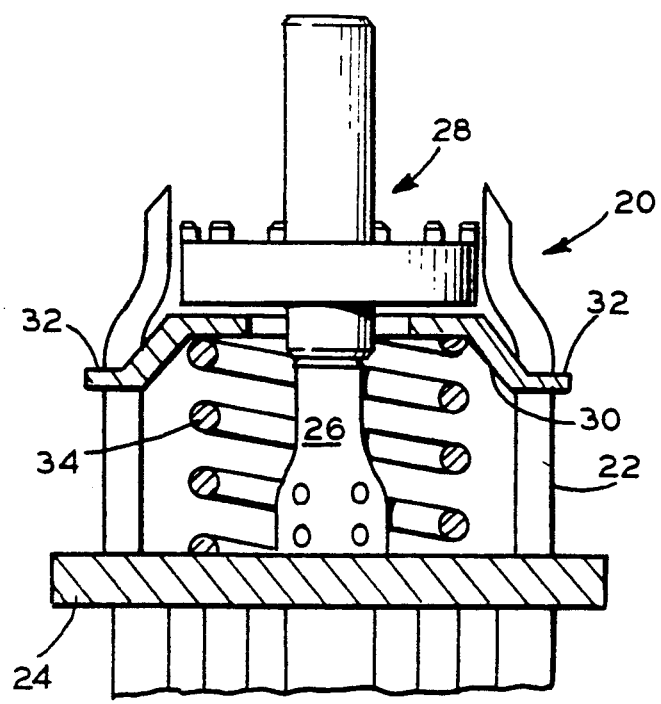
FIG. 3 is a side sectional view of a prior art upper end fitting.

FIG. 3 is a side sectional view of a prior art upper end fitting 20. Upper end fitting 20 is comprised of main body portion 22 that may be square or rectangular in section. The lower portion of main body portion 22 is rigidly attached to or may be integral with grillage or base 24. As seen more clearly in FIG. 1, the underside of base 24 is adapted for attachment to guide tubes 16. Pedestal 26 is attached to base 24 and extends upward therefrom to support control assembly 28. Spring retainer 30 is positioned inside main body portion 22 for movement therein and is provided with tabs 32 that are received in slots in main body portion 22. Spring retainer 30 thus serves to maintain helical spring 34 in its installed position in main body portion 22.

Figure 2:
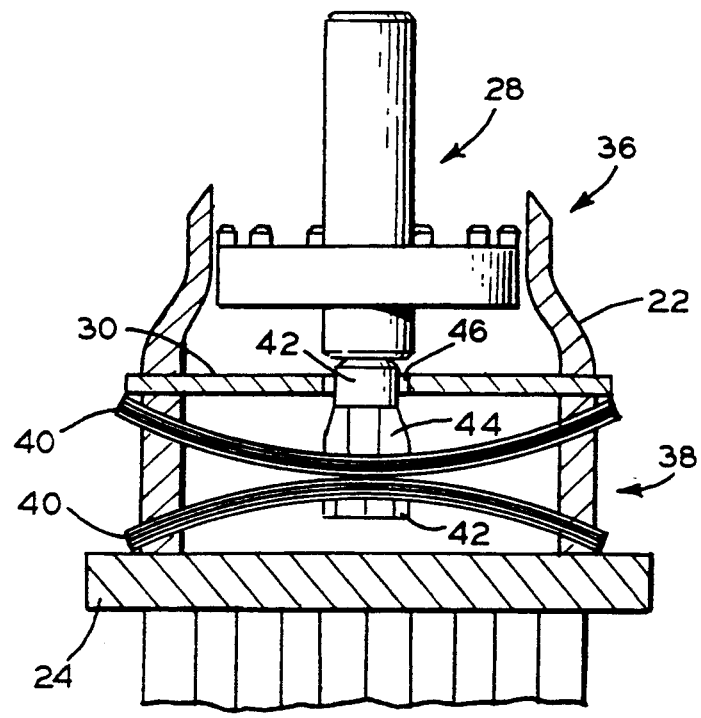
FIG. 2 is a side sectional view of the invention.

FIG. 2 illustrates upper end fitting 36 of the present invention. Upper end fitting 36 is similar in basic construction to that of the prior art in FIG. 3 in that it is formed from main body portion 22, base 24, and a spring retainer 30. However, upper end fitting 36 is provided with a combined pedestal and holddown spring assembly 38. Leaf springs 40 are positioned adjacent each other such that the exterior radius of the springs are facing each other. Each leaf spring 40 is provided with a bore for receiving a bolt 42 therethrough. Nut 44 is threadably received on bolt 42 for holding leaf springs 40 together. Bolt 42 and nut 44 are sized so as to extend upwardly through a bore 46 in spring retainer 30 to the correct height to serve as a pedestal support for control assembly 28. Spring retainer 30 is free to move vertically in main body portion 22 and extends through slots therein.

Figure 4:
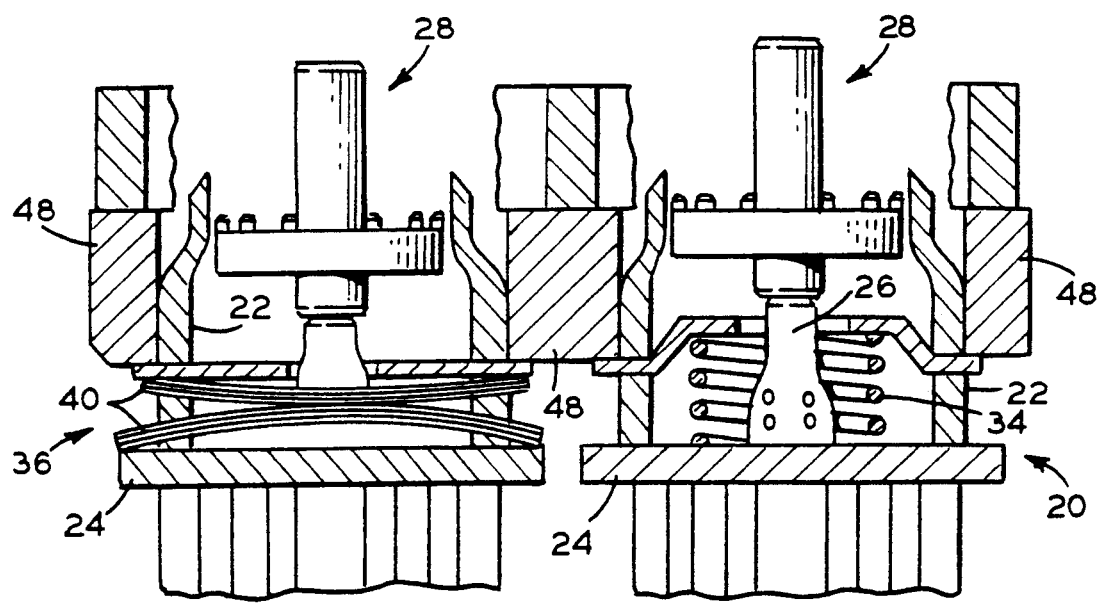
FIG. 4 is a side sectional view illustrating the invention and the prior art end fitting when under load in their installed position.

FIG. 4 illustrates the prior art upper end fitting 20 and upper end fitting 36 of the present invention as they appear in their installed position inside a nuclear reactor. Reactor internals 48 bear against the portion of spring retainers 30 that extend out of main body portion 22. This places the desired spring preload pressure on nuclear fuel assembly 10 to prevent unwanted movement caused by coolant flow during normal operations. Upper end fitting 36 causes less upward displacement of control assembly 28 than the prior art end fitting 20 at the time of installation and during irradiation growth of the assembly. During irradiation growth, base 24 is caused to move upward. In the prior art end fitting 20, pedestal 26 moves upward the same distance as base 24 and affects the vertical position of control assembly 28. In upper end fitting 36, the pedestal formed by bolt 42 and nut 44 do not move in proportion to that of base 24. The nut and bolt pedestal move approximately one-half the distance of base 24 as leaf springs 40 are flattened to a greater degree. The invention thus has much less effect on the vertical position of control assembly 28 than prior art end fitting 20. The length of the longer bolt and nut used to attach the springs together and form the pedestal assembly, as opposed to a shorter bolt and nut that would be used merely to attach the leaf springs together, results in added flexibility of the nut and bolt and provides a better structural connection for the spring assembly.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An upper end fitting for a nuclear fuel assembly, comprising:
   a. a main body portion,
   b. a base rigidly attached to said main body portion;
   c. two leaf springs attached together with their exterior radius facing each other and received at each end within said main body portion, said leaf springs each having a bore therethrough;
   d. a pedestal formed from a bolt and nut attached to and received through the bores in said leaf springs and extending from said leaf springs away from said base; and
   e. a spring retainer slidably received within said main body portion, said retainer having a bore therethrough sized to movably receive said pedestal.

* * * * *